July 15, 1969
S. E. ATHEY ETAL
3,456,180
MOTOR SPEED CONTROL
Filed July 10, 1967
3 Sheets-Sheet 1
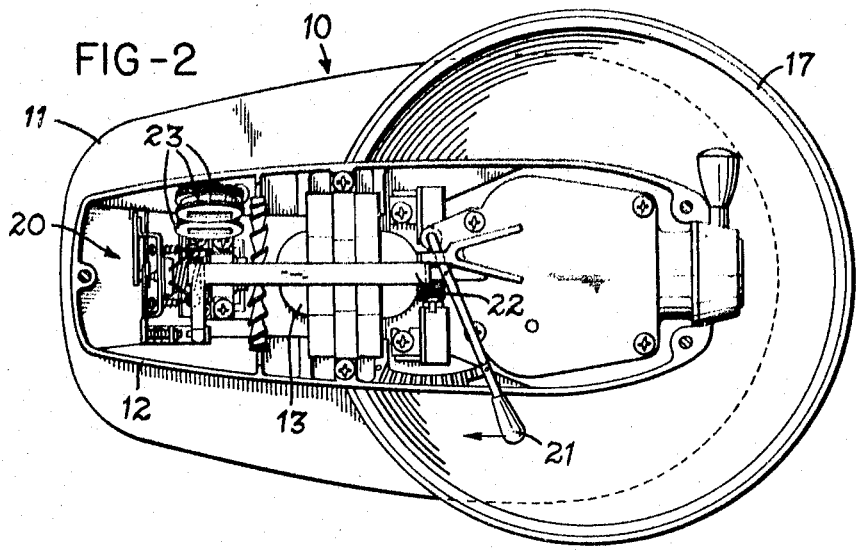
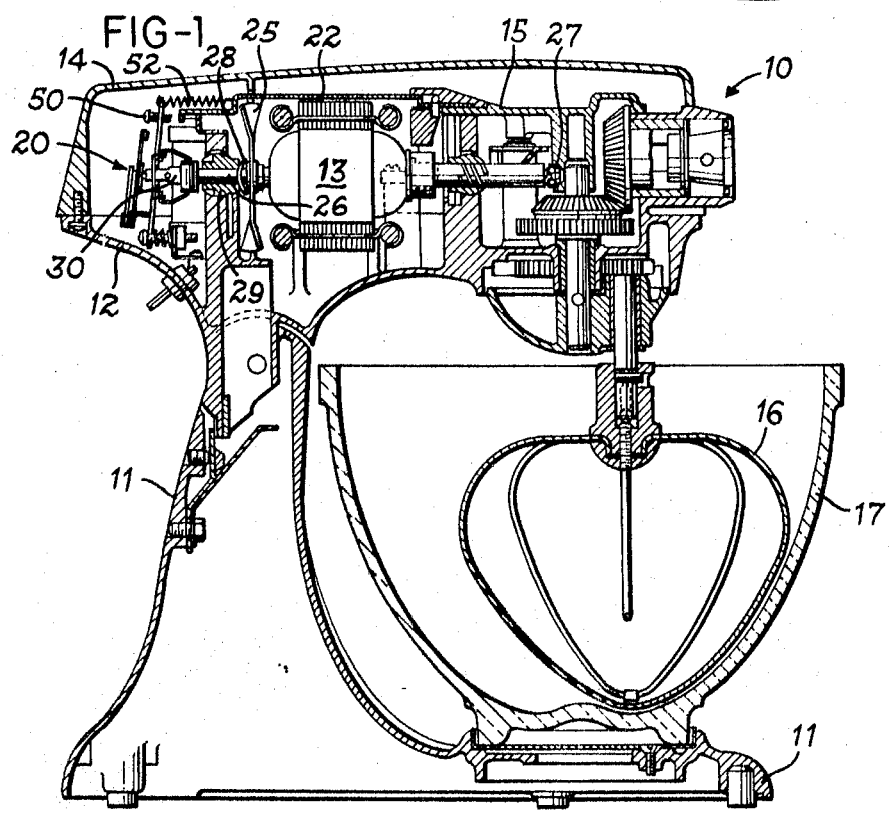
INVENTORS
STUART E. ATHEY &
CHARLES M. ALLEN
BY
Marechal, Biebel, French & Bugg
ATTORNEYS

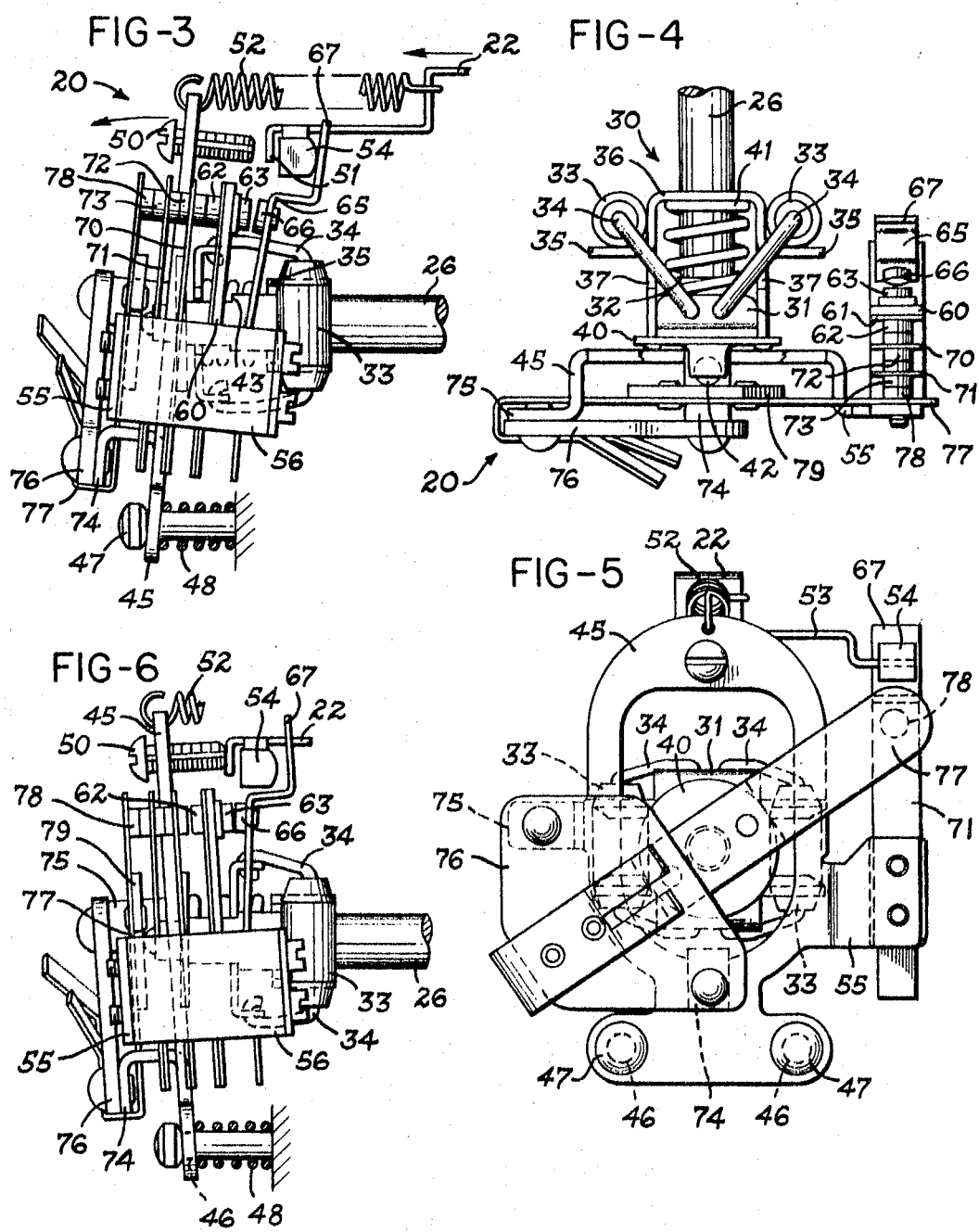

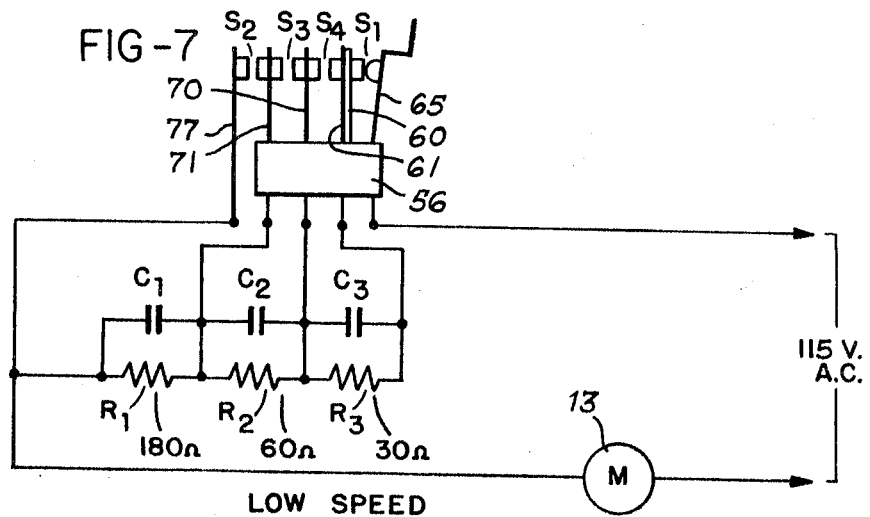
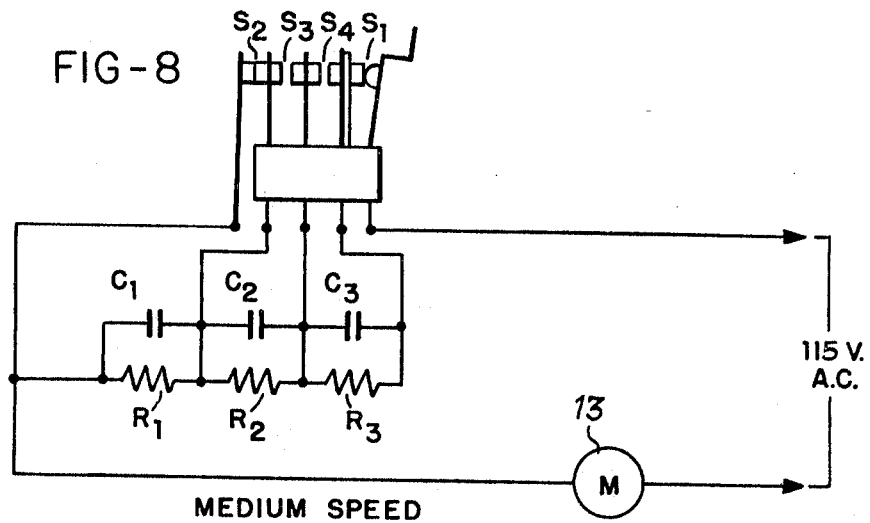
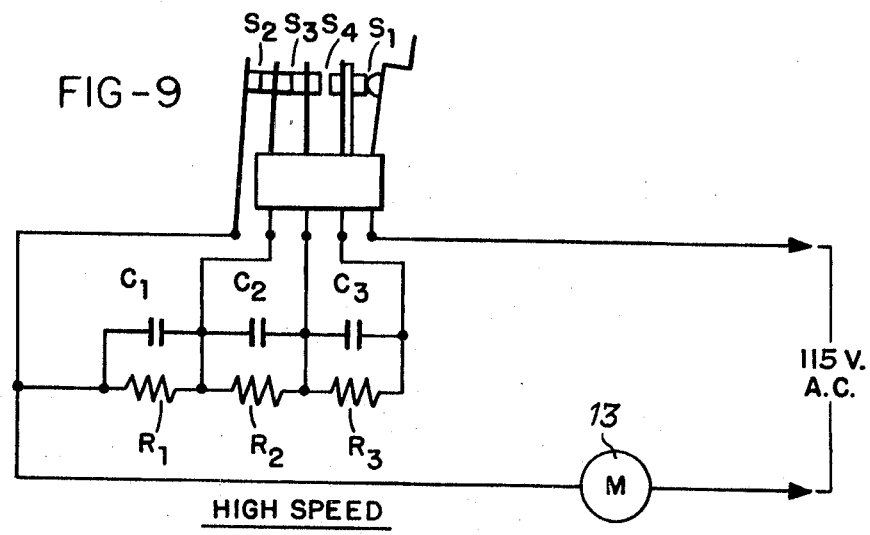

United States Patent Office 3,456,180
Patented July 15, 1969

3,456,180
MOTOR SPEED CONTROL
Stuart E. Athey and Charles M. Allen, Troy, Ohio, assignors to The Hobart Manufacturing Company, Troy, Ohio, a corporation of Ohio
Filed July 10, 1967, Ser. No. 652,247
Int. Cl. H02k 27/20; H02p 5/08
U.S. Cl. 318—325
2 Claims

ABSTRACT OF THE DISCLOSURE

A speed control for a universal motor includes a plurality of switch contacts connected in shunt with a corresponding plurality of series resistors in the circuit to a universal motor. The switch contacts are opened and closed sequentially to control the speed of the motor. Depending upon the speed selected and the load imposed upon the motor, certain switch contacts will be effective in controlling the current through the motor, allowing the motor to develop its full rated power regardless of the speed selected and providing for smooth transition between speed settings and changes in the load imposed upon the motor.

Background of the invention

Prior art speed controls for universal motors include a governor mounted to rotate on the motor shaft and a switch contact manually positionable by the operator to select the motor speed, and operable by the governor to maintain the selected speed. Once the motor reaches the predetermined speed, the governor will open the switch contacts, remove power from the motor, which then slows down, with the result that the governor withdraws from the switch contact, thereby allowing power to be reapplied to the motor. In other words, current is alternately supplied to the motor at full value and then at zero value during the operation of the motor. This discontinuous application of current results in jerky operation of the motor, especially when the motor is subject to rapidly varying loads.

Other types of prior art devices include switches actuated by the lateral movement of the motor armature as the amount of load imposed on the motor output changes. With this type of control, however, the switches control the current through the motor only in response to the load applied, but not in response to the speed of the motor.

Summary of the invention

This invention relates to an improved motor speed control wherein the current to the motor is varied in incremental steps as the motor obtains the preselected speed and as the load on the motor changes, thus allowing varying amounts of current to be supplied to the motor. The improved motor speed control includes a plurality of switches mounted on a plate manually movable by the operator with respect to the end of the motor shaft. A centrifugal switch actuator or governor, mounted to rotate with the shaft, engages the switch contacts as the motor speed approaches that selected by the operator to open the switch contacts in sequence. The switches are electrically connected to shunt a corresponding number of resistors in series with the motor. Therefore, the amount of resistance in the motor circuit will be controlled by the number of switch contacts which are closed.

Since more current is needed in the motor circuit during the high speed operation of the motor than during low speed operation, it follows that more switches will be closed during the high speed operation. Similarly, increasing the load on the motor will increase the current required by the motor to maintain a preselected speed and therefore with heavy loads, even at low speeds, more switches will be closed to supply the necessary current to the motor. This is a self-regulating feature of this invention. By providing a plurality of switch contacts in parallel with a plurality of resistors, smooth transition in the current supplied to the motor is possible throughout the entire speed range of the motor and under varying load conditions. With this improved speed control, the motor has less tendency to "cycle" or to change speed abruptly as is the case with prior art governors where the current to the motor is either on or off.

It is therefore an object of this invention to provide an improved speed control for a universal motor including a plurality of switch contacts operable by a centrifugal governor mounted to rotate with the motor, the position of the switches being manually selectable by an operator to select the speed of operation of the motor, the switches functioning to shunt a plurality of resistors connected electrically in series with the motor and thus vary the current to the motor in small incremental steps.

Brief description of the drawings

FIG. 1 is an elevational view of a food mixer employing this invention with the housing of the mixer shown in cross section to reveal the arrangement of the universal motor, the speed control, and the beater mechanism;

FIG. 2 is a top view of the food mixer shown in FIG. 1 with the cover of the housing removed to show the relationship of the structure comprising this invention to the remainder of the mixer;

FIG. 3 is an elevational view of the speed control member of this invention shown in the off position;

FIG. 4 is a top view of the speed control member shown in FIG. 3;

FIG. 5 is an end view of the speed control member;

FIG. 6 is an elevational view of the speed control member shown in the high speed position;

FIG. 7 is a schematic electrical diagram with the speed control member shown operating in the low speed configuration;

FIG. 8 is a schematic electrical diagram with the speed control member shown in the medium speed configuration; and FIG. 9 is an electrical schematic diagram showing the speed control member in the high speed configuration.

Detailed description of the invention

Reference is now made to FIG. 1 which shows the motor speed control of this invention mounted for use in a food mixer 10. The mixer comprises a base 11, a housing 12 containing a motor 13, and a cover for the housing 14. The motor 13 may be of the universal type, that is, it may be operated from either A.C. or D.C., and its speed is controlled by the current flowing through its field windings and armature. The output of the motor is connected to a gear assembly 15 which drives a beater 16 in a bowl 17. A more complete description of the beater mechanism may be found in United States Patent No. 2,185,155.

The speed control member shown generally at 20, controls the current through the motor and thus its speed of operation. The handle 21 extending through the side of the housing, as shown in FIG. 2, moves an actuating member or link 22 to position the speed control 20. The handle 21 and the link 22 thus form a manual control for adjusting the position of the control member between a low speed position and a top speed position through a plurality of discrete intermediate positions.

A plurality of resistors 23 are mounted within the housing and are connected in series with the motor 13 to control the current through its field winding and armature. The heat generated by the current passing through the motor and resistors is dissipated by a fan 25 connected to rotate with the shaft 26 of the motor. The fan removes the heat generated through slots (not shown) formed in the housing 12.

The right hand end of the motor shaft 26, as shown in FIG. 1 is maintained in a thrust bearing 27 and the shaft is urged toward the thrust bearing by a spring 28 located between the bearing 29 and the fan 25 at the left hand end of the shaft. This arrangement prevents the shaft 26 from moving laterally in response to varying loads which may be imposed upon the motor through the beater 16.

A governor 30 is mounted at the left hand end of the shaft 26 and cooperates with the speed control 20 to control the current through the motor. Referring to FIG. 4, the governor 30 comprises a mounting plate 31 having a collar 32 which is pressed onto the shaft 26. The collar 32 includes a slot, not shown, formed to receive a key projecting from the shaft 26 to prevent the governor from rotating relative to the shaft during operation of the motor. A pair of weights 33 are connected to the plate 31 by the formed wires 34. Each of the weights 33 may roll on the outwardly extending fingers 35 of the assembly 36. In the governor mechanism shown, the fingers 35 are bifurcated so that the assembly 36 can be made from a single piece of metal. Formed integrally with the assembly 36 are forwardly extending portions 37 having a circular plate 40 mounted at their ends. The assembly 36 includes an opening at its rear portion which surrounds but does not contact the shaft 26, thus allowing lateral movement. A spring 41 urges the assembly 36 rearwardly by exerting a biasing force between the plate 31 and the assembly 36.

As the governor rotates, centrifugal force will tend to move the weights 33 outwardly, restrained by the force exerted by the spring 41 and the spring tension of the speed control assembly, thus moving the bifurcated fingers 35 as well as the entire assembly 36, except for the mounting plate 31, forward on the shaft 26. The circular plate 40, which forms the output member of the governor and which is therefore movable to a position determined by the actual motor speed, includes a ball 42 mounted at its front surface. The lateral movement of the output member 40 is limited by the notch 43 formed on the forwardly extending portions 37 which engage the plate 31. Thus, the distance existing between the plate or output member 40 and the end of the shaft 26 or the plate 31 is a function of the speed of rotation of the shaft 26.

The speed control assembly 20, shown in detail in FIGS. 3 through 6, includes a supporting frame 45 having a pair of openings 46 in its lowermost extent through which bolts 47 extend adjustably into a bracket secured to the mixer housing. A pair of springs 48 urge the frame 45 against the head of the bolt and thus the head of the bolt provides a pivot about which the frame 45 may rotate. A bolt 50 is adjustably mounted in the uppermost portion of the frame 45 and is positioned to engage the bent down end portion 51 of the manually movable actuating member 22. A spring 52 extends between the actuating member or link 22 and the frame 45 to urge the frame toward the actuating member 22 at all times. Thus, as the actuating member 22 is moved from the off position, as shown in FIG. 3, to the on position and toward the higher speed positions, the end 51 will engage the bolt 50 and move the entire frame 45 about its pivot to the position shown in FIG. 6.

High speed adjustment of the assembly 20 may be accomplished by positioning bolt 50 with respect to the actuating member 22, while low speed adjustment is determined by the position of bolts 47 with respect to the housing.

The actuating member or link 22 also includes a laterally extending arm 53 supporting an insulating block of material 54, such as nylon, which engages the power control switch assembly so that, when the handle 21 is in its off position, or when the actuating member 22 is moved to the extreme right hand position as shown in FIG. 3, the insulating block 54 will open the power control switch contacts to prevent any current from flowing in the motor circuit.

Extending outwardly from the frame 45 of the control assembly 20, but integral therewith, is a bracket 55 which has mounted thereto a molded block of insulated material 56 supporting the speed control switches. The rigid member 60 extending upwardly from the block 56 is formed from brass or other similar rigid material and has immediately adjacent thereto a Phosphor-bronze, or similarly conductive strip 61. A pair of contacts 62 and 63 are electrically connected to the strip 61.

The power control switch includes a flexible Phosphor-bronze strip 65, also extending from the block 56, positioned immediately to the right of plates 61 and 60, as shown in FIG. 3, which has mounted thereon a contact 66 so positioned as to engage the contact 63 when moved toward it. An upwardly extending arm 67 on the flexible Phosphor-bronze strip 65 cooperates with the insulating block 54 on the manually operable actuating member 22 to move contact 66 away from contact 63, when the actuating member is in the off position. The flexible strip 65 is biased so as to urge the contact 66 into electrically conductive engagement with the contact 63, thus forming a normally closed switch S1.

Mounted to the left of the plate 61 are two spaced apart flexible Phosphor-bronze strips 70 and 71 having secured to their upper end portions contacts 72 and 73, rsepectively. The flexible strips 70 and 71 are so positioned that, absent any forces acting thereon, the contacts 72 and 73 are separate from each other and from the contact 62. In other words, the switches thus described are normally open.

The frame 45 also includes a pair of brackets 74 and 75 supporting the insulating plate 76. An arm of electrically conductive material 77 is secured to the plate 76 and extends diagonally across the frame 45. This arm 77 includes at its end a contact 78 so positioned as to engage the contact 73. Contacts 78 and 73 form switch S2, contacts 73 and 72 form switch S3, and contacts 72 and 62 form switch S4. The arm 77 is made of a spring material and is biased such that it tends to close each of the switches S2, S3 and S4 in opposition to the governor output member. The rigid support 60 prevents movement of the contact 62.

An insulating and thrust plate 79 is mounted at the center of the arm 77 and receives the ball bearing 42 on the output member 40. Thus, as the motor speed increases, the governor will move the output member 40, and the ball bearing 42, outwardly and into contact with the plate 79 to oppose the bias exerted by the spring biased arm 77 and thereby sequentially to open the switches S4, S3 and S2, in that order.

Reference is now made to FIG. 7 which is an electrical schematic diagram showing the relative position of the switch contacts with respect to each other when the speed control member is moved to the low speed operating position. The power control switch S1 will be closed to provide a path of current to the motor 13 through resistors R1, R2 and R3. These resistors are in parallel with switches S2, S3 and S4, respectively. Capacitors C1 through C3 shunt each of the switches to provide arc damping. Thus, when the control member is moved initially to the low speed position, the spring bias of the arm 77 will move contact 78 into engagement with contact 73 in switch S2 to short out resistor R1 and thereby increase the current into the motor 13. In the initial starting condition, switches S2 through S4 will be closed to supply the full current to the motor windings. However, as the motor gains speed, the output member 40 of the governor will begin to overcome the bias on the arm 77 and switch S4 will open first, following by the opening of switch S3, thus placing both resistor R2 and R3 in series with the motor.

Once the motor reaches its predetermined low operating speed, switch S2 will intermittently open and close, placing resistor R1 in and out of the motor circuit, thus providing a relatively small incremental change in the current to the motor compared with the current change in prior art speed controls. With resistors R1 in the circuit, the motor 13 will being to slow down, the output member of the governor will withdraw and switch S2 will close. Before switch S3 closes, however, the motor will have regained sufficient speed to move the output member of the governor outwardly and again open switch S2. Thus, the cycle will repeat itself many times to maintain the speed of the motor.

Should the output of the motor receive an increased load, such as may be the case where the motor is used to drive a beater in a food mixer, the motor will again tend to slow down and will require more current for its operation at the predetermined speed. In that case, switch S2 will remain closed to shunt resistor R1 out of the circuit entirely and switch S3 will operate intermittently to place resistor R2 in and out of the motor circuit to maintain the motor at its preselected speed, while permitting higher currents to flow in the motor circuit.

It is easily understood that by providing a plurality of switches, each shunting a fixed resistor, finer control is provided over the current passing through the motor and that the motor is always supplied with some current even though all of the switch contacts are open.

Referring now to FIG. 8, it is now apparent that moving the control member to the medium speed position requires that the output member of the governor move further to the left, as viewed in FIG. 6, and therefore the motor must rotate faster before the output member engages the arm 77. In the medium speed operating range, under normal load conditions the motor will require more current than in the low speed range and therefore switch S2 will remain closed, thus shorting out resistor R1, while switch S3 will alternately open and close to place resistor R2 in and out of the motor control circuit. Again, if the load on the motor increases, still more current will be required and therefore switch S3 will close, and switch S4 will be effective in controlling motor speed.

With reference to FIG. 9, it is apparent that moving the control member to the high speed position, which incidentally is the same position as shown in FIG. 6, the motor must operate at a relatively high speed in order for the output member of the governor to engage the arm 77 and thus overcome its bias. Since high speed operation requires more current than either low or medium speed operation, switch S4 will be effective in controlling the motor speed while switches S2 and S3 will remain closed to short out resistors R1 and R2 and thus supply sufficient current to the motor. If the load on the motor increases in the high speed position, requiring still more current, switch S4 will close and the full available current will be applied through the motor. Switch S4 will remain closed until the motor obtains a speed sufficient to move the output member 40 of the governor a distance sufficient to overcome the bias on arm 77.

It will thus be seen that the switch contacts operate sequentially, that is, contacts 78 will first engage contact 73 in switch S2, and then the contact 73 will engage contact 72 in switch S3, and thereafter contact 72 will engage contact 60 in switch S4. It will also be noted, since different amounts of current are required for the different general speed ranges indicated, that different switches are used to control the current through the motor in the different speed ranges. It is understood, of course, that more than one switch may actually be used in the control of the current through the motor, the particular switch or switches being used depending on the motor speed selected and the load applied to the motor.

While the form of apparatus herein described constitutes a preferred embodiment of the invention, it is to be understood that the invention is not limited to this precise form of apparatus, and that changes may be made therein without departing from the scope of the invention which is defined in the appended claims.

What is claimed is:

1. A speed control for selecting and maintaining different speeds of a universal motor subject to varying loads, said control including a plurality of resistors of fixed value connected in series with each other and with said motor and a corresponding plurality of shunting circuits, one for each resistor, which can be completed to increase the current supplied to said motor, a governor rotatably driven by said motor and having an output member movable according to the actual motor speed, and an arm engaging said output member and movable thereby, the improvement comprising a control member providing a mounting for said arm;
means mounting said control member for movement toward and away from said governor output member to vary the position at which said output member functions to move said arm;
a manual control for adjusting the position of said control member between a low speed position and a top speed position through a plurality of discrete intermediate speed positions;
switch means movable with said control member and including a plurality of pairs of normally open contacts constructed and arranged for sequential opening and closing, each one pair connected to control a corresponding one of said shunting circuits;
and means biasing said arm toward said switch means tending to close said contacts in opposition to the movement of said governor output member resulting from increasing motor speed whereby the position of said control member and the position of said governor output member combine to control the pairs of contacts actually closed.

2. A speed control as defined in claim 1, wherein said manual control includes a link connected to move said control member to a selected position, a power control switch connected in series with said motor, and a connection between said link and said power control switch for starting and stopping said motor from the same control employed for speed selection.

References Cited

UNITED STATES PATENTS

| | | | |
|---|---|---|---|
| 2,703,381 | 3/1955 | Jepson | 318—325 |
| 2,823,549 | 2/1958 | Buckman et al. | 318—325 |
| 2,904,738 | 9/1959 | Hall | 318—325 |

ORIS L. RADER, Primary Examiner

K. L. CROSSON, Assistant Examiner

U.S. Cl. X.R.

318—348